P. ANDERSON.
CUPOLA FURNACE.
APPLICATION FILED AUG. 16, 1911.
1,054,381.
Patented Feb. 25, 1913.
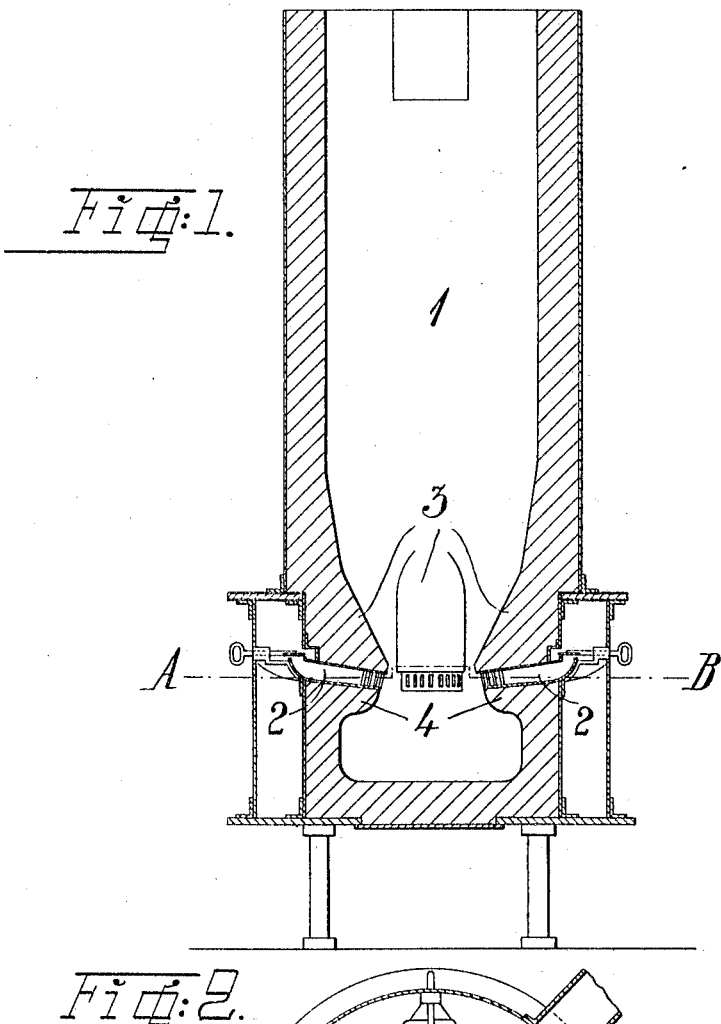
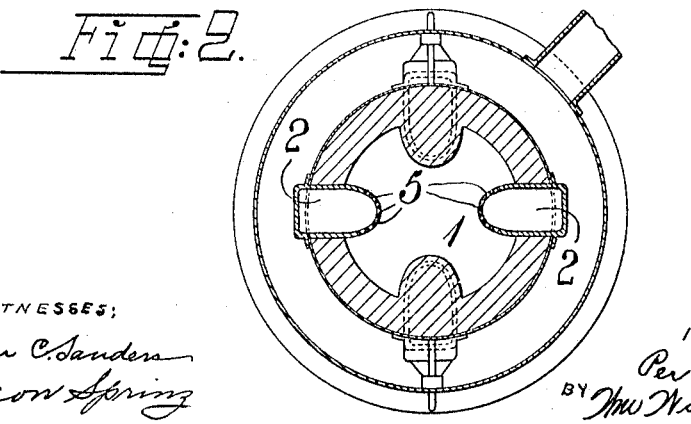

UNITED STATES PATENT OFFICE.

PER ANDERSON, OF ARVIKA, SWEDEN.

CUPOLA-FURNACE.

1,054,381. Specification of Letters Patent. Patented Feb. 25, 1913.

Application filed August 16, 1911. Serial No. 644,338.

*To all whom it may concern:*

Be it known that I, PER ANDERSON, a subject of the King of Sweden, residing at Kyrkogatan 146, Arvika, Sweden, have invented new and useful Improvements in Cupola-Furnaces, of which the following is a specification.

In metallurgical furnaces, as is well known, the fuel consumption per weight unit of the product obtained generally will decrease as the size of the furnace increases. From this rule, however, the cupola furnaces make an exception, the relative fuel consumption in such furnaces increasing with an increased furnace volume, which circumstance probably depends on the fact, that in large (wide) furnaces of this kind the combustion air introduced through the twyers cannot penetrate into the central portion of the furnace. Thus the fuel in said portion is not completely burned and its heating effect is not utilized for the melting process. Efforts have been made to remove this inconvenience by contracting considerably the shaft of such furnaces at the level of the twyers, but such a step has again caused the draw-back, that the air quantity supplied by the twyers has been too large in proportion to the coke quantity in this part of the furnace, the air thus exerting an oxidating and cooling action on the iron flowing down through said portion. The usual cupola furnaces, moreover, have the drawback, that the slag is cooled by the cold air blast close to the furnace wall and is solidified around the twyers, necessitating several times a breaking-up operation for removing the same.

The object of the present invention is to arrange a cupola furnace in such manner as to make it possible to introduce, even in large furnaces, without considerably contracting the same at the twyers and without increasing the blast pressure, a sufficient quantity of combustion air in the central portion of the furnace, and thus to operate such furnaces economically. In the same time the cooling of the slag, close to the furnace wall is prevented.

In the accompanying drawing, a cupola furnace constructed in accordance with the present invention is shown in a central vertical section in Figure 1 and in a horizontal section through the twyers on the line A—B (Fig. 1) in Fig. 2.

1 is the shaft of the furnace and 2 the twyers, which are shown in the drawing to be four, but of course may vary in number. These twyers according to the present invention, extend into the shaft toward the central axis of the same and are covered on the upper side by sloping brackets 3 of refractory material, their lower sides being also protected by a similar lining 4. For distributing the air blast more uniformly in the furnace, the inner ends of the twyers should preferably not be quite open, but covered by a curved wall, which is provided with a plurality of slots or holes 5 arranged in such manner, that the air will enter the furnace in jets spread like a fan and issuing from the center as well as from the sides of the twyer without, however, directly hitting the adjacent furnace wall.

It can easily be seen, that by extending the twyers through a certain distance into the furnace shaft the necessary combustion air can be supplied to the central portion of the latter. Also by introducing the air in jets in different directions the air is more uniformly distributed and more completely utilized for the combustion. By the introduction of the air closer to the central axis of the furnace and the aforesaid distribution of the same also the solidification of the slag around the nozzles is prevented and finally also the heavy wear and burning of the furnace wall which are caused when the air is introduced close to the wall and preferably finds its way along the same.

Having now particularly described the nature of my invention and the manner of its operation, what I claim is:

1. A cupola furnace with one row of twyers projecting into the furnace inside the normal non-contracted furnace wall and protected on the upper side by brackets of refractory material, said twyers having about the same width as length.

2. A cupola furnace with one row of twyers projecting into the furnace inside the normal non-contracted furnace wall and protected on the upper side by brackets of refractory material, said twyers having
5 about the same width as length and outlet openings along their whole horizontal circumference.

In testimony whereof I have signed my name to this specification in the presence of two subscribing witnesses.

PER ANDERSON.

Witnesses:
HUGO PETERSON,
F. LAGARBERG.

Copies of this patent may be obtained for five cents each, by addressing the "Commissioner of Patents, Washington, D. C."